(12) United States Patent
Burger et al.

(10) Patent No.: US 7,831,593 B2
(45) Date of Patent: Nov. 9, 2010

(54) SELECTIVE AUTOMATIC REFRESHING OF STORED EXECUTION PLANS

(75) Inventors: Louis Burger, Escondido, CA (US);
Thomas Julien, San Diego, CA (US);
Frank Roderic Vandervort, Ramona, CA (US)

(73) Assignee: Teradata US, Inc., Miamisburg, OH (US)

( * ) Notice: Subject to any disclaimer, the term of this patent is extended or adjusted under 35 U.S.C. 154(b) by 186 days.

(21) Appl. No.: 11/681,799

(22) Filed: Mar. 5, 2007

(65) Prior Publication Data

US 2007/0208695 A1 Sep. 6, 2007

(51) Int. Cl.
*G06F 17/30* (2006.01)

(52) U.S. Cl. .............................. 707/718; 707/E17.075; 707/E17.132

(58) Field of Classification Search ................. 707/609, 707/705, 718, 802, E17.075, E17.132
See application file for complete search history.

(56) References Cited

U.S. PATENT DOCUMENTS

| | | | | |
|---|---|---|---|---|
| 5,572,673 A | * | 11/1996 | Shurts | 726/17 |
| 5,717,911 A | * | 2/1998 | Madrid et al. | 707/2 |
| 6,704,724 B1 | * | 3/2004 | Ellmann et al. | 707/4 |
| 7,185,000 B1 | * | 2/2007 | Brown et al. | 707/718 |
| 7,624,094 B2 | * | 11/2009 | Ellis et al. | 1/1 |
| 2005/0097078 A1 | * | 5/2005 | Lohman et al. | 707/2 |
| 2006/0294058 A1 | * | 12/2006 | Zabback et al. | 707/2 |

OTHER PUBLICATIONS

Kabra et al., Efficient Mid-Query Re-Optimization of Sub-Optimal Query Execution Plans, 1998, ACM, pp. 106-117.*
Steve McConnell, The Basics, 1998, Microsoft Press, pp. 1-48.*
Ilyas et al., Estimating Compilation Time of a Query Optimizer, 2003, ACM, pp. 373-384.*
Suganuma et al., A Region-Based Compilation Technique for Dynamic Compilers, Jan. 2006, ACM, pp. 134-174.*
Randy H. Katz, Performance enhancement for relational systems through query compilation, 1979, National Computer Conference, pp. 741-747.*
Kalen Delaney, Tracking Recompiles, 2005, SQL Server Magazine, pp. 1-2.*
Kalen Delaney, Conditional Recompile, 2005, SQL Server Magazine, pp. 1-3.*
Kalen Delaney, Reusing Query Plans, 2005, SQL Server Magazine, pp. 1-2.*

* cited by examiner

*Primary Examiner*—Fred I Ehichioya

(57) ABSTRACT

A system and method for selectively recompiling stored execution plans within a database system. In one technique the execution plans include respective version numbers of database software operable within the database system during compilation of the respective plans. A request is received to execute one of the stored execution plans, and the stored execution plan is retrieved from computer memory. A version number is obtained of database software operable within the database system during retrieval of the stored execution plan. The obtained version number is compared with the version number associated with the retrieved execution plan. On detecting a mismatch between the obtained version number and the retrieved version number, the stored execution plan is recompiled. In another technique the stored execution plans include respective cost parameters representing the hardware capabilities of the system at the time of plan compilation. A set of cost parameters representing the cost of executing the stored execution plan within the database system is compared with the stored cost parameters associated with the retrieved execution plan. On detecting a significant difference between the defined cost parameters and the retrieved cost parameters, the stored execution plan is recompiled.

16 Claims, 3 Drawing Sheets

SELECTIVE AUTOMATIC REFRESHING OF STORED EXECUTION PLANS

BACKGROUND

Computer systems generally include one or more processors interfaced to a temporary data storage device such as a memory device and one or more persistent data storage devices such as disk drives. Data is usually transferred between the memory device and the disk drives over a communications bus or similar. Once data has been transferred from a disk drive to a memory device accessible by a processor, database software is then able to examine the data to determine if it satisfies the conditions of a query.

Queries issued to the database system may be processed with a multitude of possible execution plans. Some execution plans are more cost efficient than other execution plans based on several factors including the number and size of intermediate result sets required to be constructed. Some queries are able to undergo query optimization that can enable dramatic improvements in performance in such database systems. A cost based query optimizer evaluates some or all possible execution plans for a query and estimates the cost of each plan based on resource utilization. The optimizer eliminates costly plans and chooses a relatively low cost plan.

Many relational database systems have the capability of persistently storing a compiled execution plan for a SQL query and reusing the saved plan for subsequent executions of the same query. This technique saves the CPU cost of having to repeatedly parse and optimize frequently executed queries. However, one of the drawbacks of using the same stored plan over a long period of time is that it may become sub-optimal or stale. More specifically, using the same stored plan over a long period of time prevents the query optimizer from potentially finding a new and more efficient plan, especially in those cases where there has been a significant change in data demographics since the plan was last saved.

Many database systems offer a mechanism for a user or database administrator to manually force a recompile of one or more stored plans if it is felt that a new and better plan will likely result. Thus human element of control often leads to difficulties particularly where a typical database system has hundreds or thousands of frequently executed queries. Any method that relies on manual intervention is often not practical.

SUMMARY

Described below are techniques for selectively recompiling stored execution plans within a database system In one technique the execution plans include respective version numbers of database software operable within the database system during compilation of the respective plans. A request is received to execute one of the stored execution plans, and the stored execution plan is retrieved from computer memory. A version number is obtained of database software operable within the database system during retrieval of the stored execution plan. The obtained version number is compared with the version number associated with the retrieved execution plan. On detecting a mismatch between the obtained version number and the retrieved version number, the stored execution plan is recompiled.

In another technique the stored execution plans include respective cost parameters representing the hardware capabilities of the system at the time of plan compilation. Once again a request is received to execute one of the stored execution plans and the stored execution plan is retrieved from computer memory. A set of cost parameters is defined representing the cost of executing the stored execution plan within the database system. The defined cost parameters are compared with the stored cost parameters associated with the retrieved execution plan. On detecting a significant difference between the defined cost parameters and the retrieved cost parameters, the stored execution plan is recompiled.

In a further technique the execution plans include respective sub-optimal indicators. A request is received to execute one of the stored execution plans, and the stored execution plan is retrieved from computer memory. The status of the sub-optimal indicator associated with the retrieved execution plan is checked. On detecting a positive value for the sub-optimal indicator, the stored execution plan is recompiled.

Also described are techniques for selecting one or more stored execution plans within a database system for recompilation, the stored execution plans referencing respective one or more tables defined within the database system.

In one of these techniques statistics are collected on one or more of the tables within the database system. Successive stored execution plans are retrieved from computer memory. Where a retrieved stored execution plan references at least one table on which statistics have been collected, the value of a marker in the header associated with the stored execution plan is set to indicate that the plan is sub-optimal.

In another of these techniques one or more indices are generated on one or more of the tables within the database system. Successive stored execution plans are retrieved from computer memory. Where a retrieved stored execution plan references at least one table for which one or more indices have been generated, the value of a marker in the header associated with the stored execution plan is set to indicate that the plan is sub-optimal.

DETAILED DESCRIPTION

Figure 1:
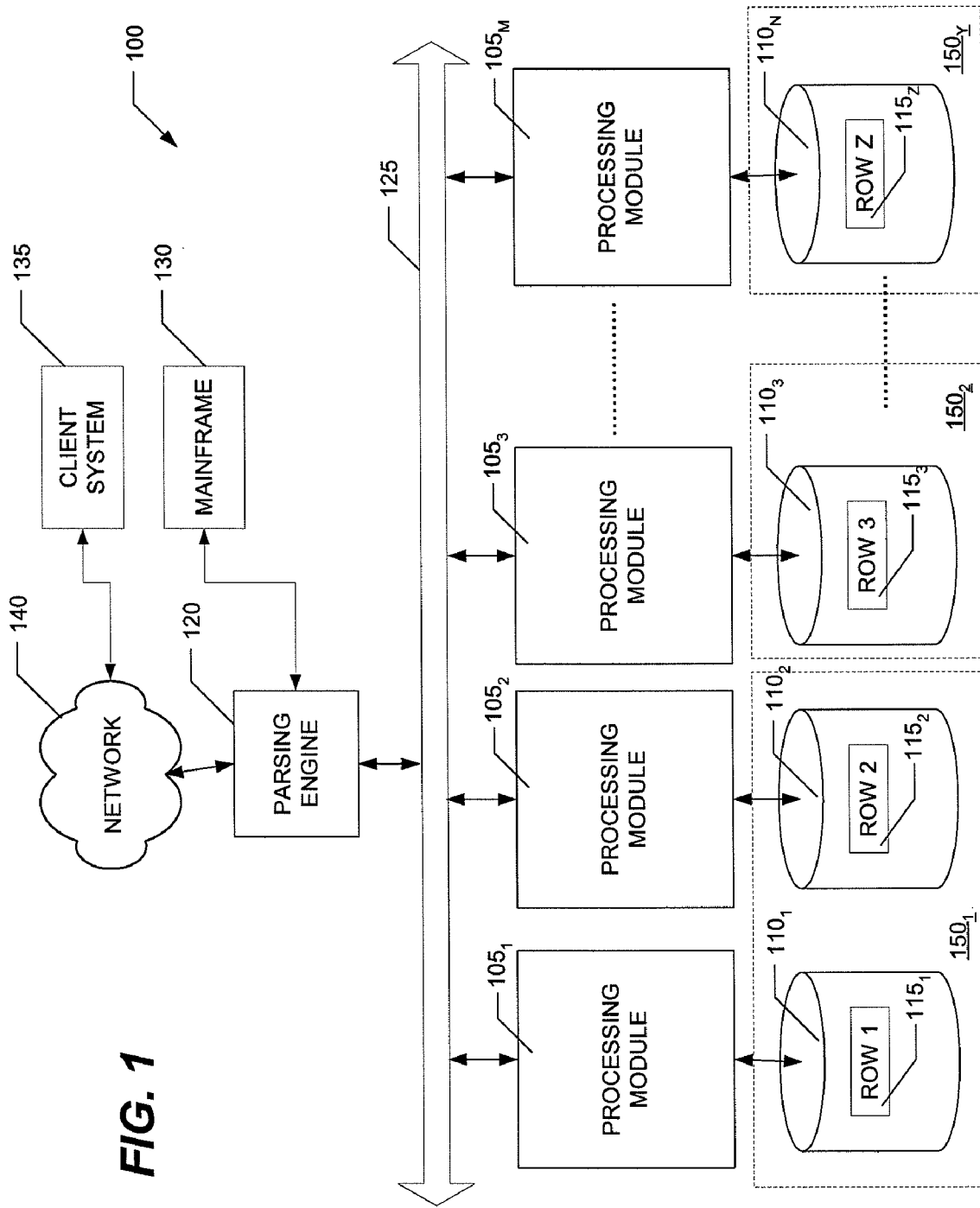
FIG. 1 is a block diagram of an exemplary large computer system in which the techniques described below are implemented.

FIG. 1 shows an example of a database system 100, such as a Teradata Active Data Warehousing System available from NCR Corporation. Database system 100 is an example of one type of computer system in which the techniques of selective automatic refreshing of stored execution plans are implemented. In computer system 100, vast amounts of data are stored on many disk-storage facilities that are managed by many processing units. In this example the data warehouse 100 includes a Relational Database Management System (RDMS) built upon a Massively Parallel Processing (MPP) platform.

Other types of database systems, such as object-relational database management systems (ORDMS) or those built on symmetric multi-processing (SMP) platforms, are also suited for use here.

The database system 100 includes one or more processing modules $105_{1 \ldots M}$ that manage the storage and retrieval of data in data storage facilities $110_{1 \ldots N}$. Each of the processing modules $105_{1 \ldots M}$ manages a portion of a database that is stored in a corresponding one of the data storage facilities $110_{1...N}$. Each of the data storage facilities $110_{1...N}$ includes one or more disk drives.

The system stores data in one or more tables in the data storage facilities $110_{1...N}$. The rows $115_{1...Z}$ of the tables are stored across multiple data storage facilities $110_{1...N}$ to ensure that the system workload is distributed evenly across the processing modules $105_{1...M}$. A parsing engine 120 organizes the storage of data and the distribution of table rows $115_{1...Z}$ among the processing modules $105_{1...M}$. The parsing engine 120 also coordinates the retrieval of data from the data storage facilities $110_{1...N}$ over network 125 in response to queries received from a user at a mainframe 130 or a client computer 135 connected to a network 140. The database system 100 usually receives queries and commands to build tables in a standard format, such as SQL.

Figure 2:
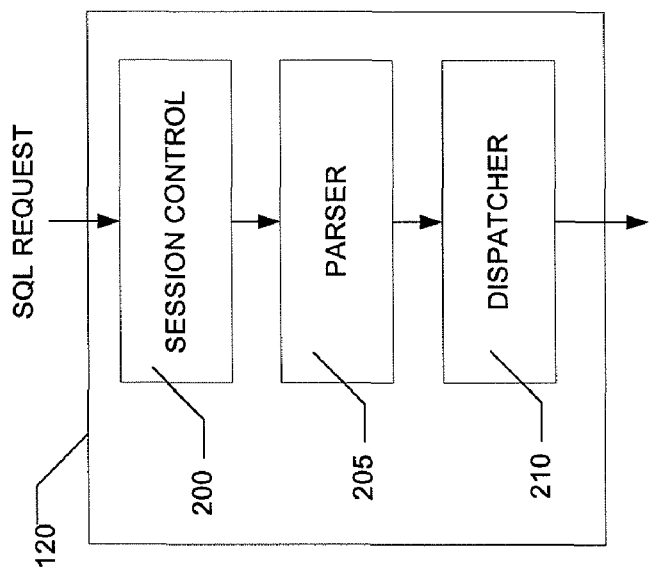
FIG. 2 is a block diagram of the parsing engine of the computer system of FIG. 1.

In one example system, the parsing engine 120 is made up of three components: a session control 200, a parser 205, and a dispatcher 210, as shown in FIG. 2. The session control 200 provides a log on and log off function. It accepts a request for authorization to access the database, verifies it, and then either allows or disallows the access.

Figure 3:
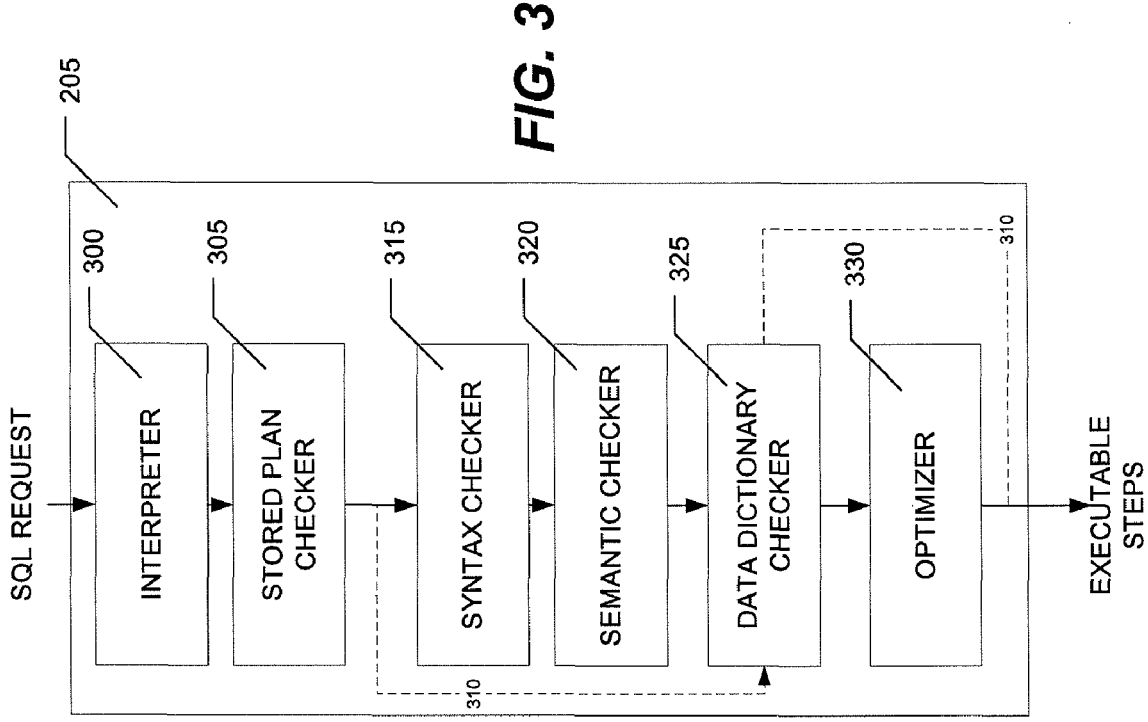
FIG. 3 is a flow chart of the parser of FIG. 2.

Once the session control 200 allows a session to begin, a user may submit a SQL request, which is routed to the parser 205. As illustrated in FIG. 3, the parser 205 interprets the SQL request (block 300). Stored compiled execution plans are typically saved in a plan cache and optionally stored in a data dictionary on disk for subsequent executions of the same query. If a given query is assigned a unique name as part of a stored procedure or similar feature, then repeated instances of the same query can be easily identified using this name. If not, the system will perform a text based comparison on the SQL to identify duplicate instances of queries. Finally, a syntax option is usually provided to manually force a recompile when executing a stored procedure or SQL select statement which if used during every invocation effectively disables the storage of plans. A stored plan checker 305 looks to see if a plan already exists for the specified SQL request in the plan cache, or in the dictionary if not found in the plan cache.

If an existing plan is found by the stored plan checker 305 then some of the following steps can be skipped as indicated by alternate path 310.

The parser checks the request for proper SQL syntax (block 315), evaluates it semantically (block 320), and consults a data dictionary to ensure that all of the objects specified in the SQL request actually exist and the user has the authority to perform the request (block 325). Finally, the parser 205 runs an optimizer (block 330) which develops the least expensive plan to perform the request.

The query processing architecture described above for most relational database systems is divided into a compile time sub-system 120, 205 to parse and optimize the SQL request and a separate run time sub-system implemented by processing modules $105_{1...M}$ to interpret the plan and execute the query. The execution plan generated at compile time is usually in the form of an intermediate language that describes low level steps to be performed including file retrievals, index usage, sorting, join operations and so on. In addition, portions of the execution plan include or potentially include actual machine code to perform comparisons, arithmetic and so on.

A stored procedure is a standard SQL feature where a collection of SQL statements is associated with a named identifier and saved in a dictionary. Because the SQL statements are associated with a named identifier, it is straightforward to store and retrieve an execution plan associated with the stored procedure. User specified features related to storing and recompiling plans are often implemented as part of stored procedures.

The typical SQL syntax for creating a stored procedure is as follows:

```
CREATE PROCEDURE <stored_procedure_name> AS
<sql_statements> [SAVE PLAN];
```

In the syntax above, if the SAVE PLAN clause is included, the compiled execution plan for the SQL statements included in the CREATE PROCEDURE feature is also stored in the dictionary.

By default, each execution of the above defined stored procedure will fetch and use a stored execution plan (if a stored execution plan has been saved) using the following syntax:

EXECUTE<stored_procedure_name>[WITH RECOMPILE];

A user is able to manually force a new plan to be generated and stored by specifying the additional clause WITH RECOMPILE during execution.

It will be appreciated that the above described syntax is only a representative example for SQL statements that create and execute stored procedures. The syntax for such commands vary from one database product to another.

Figure 4:
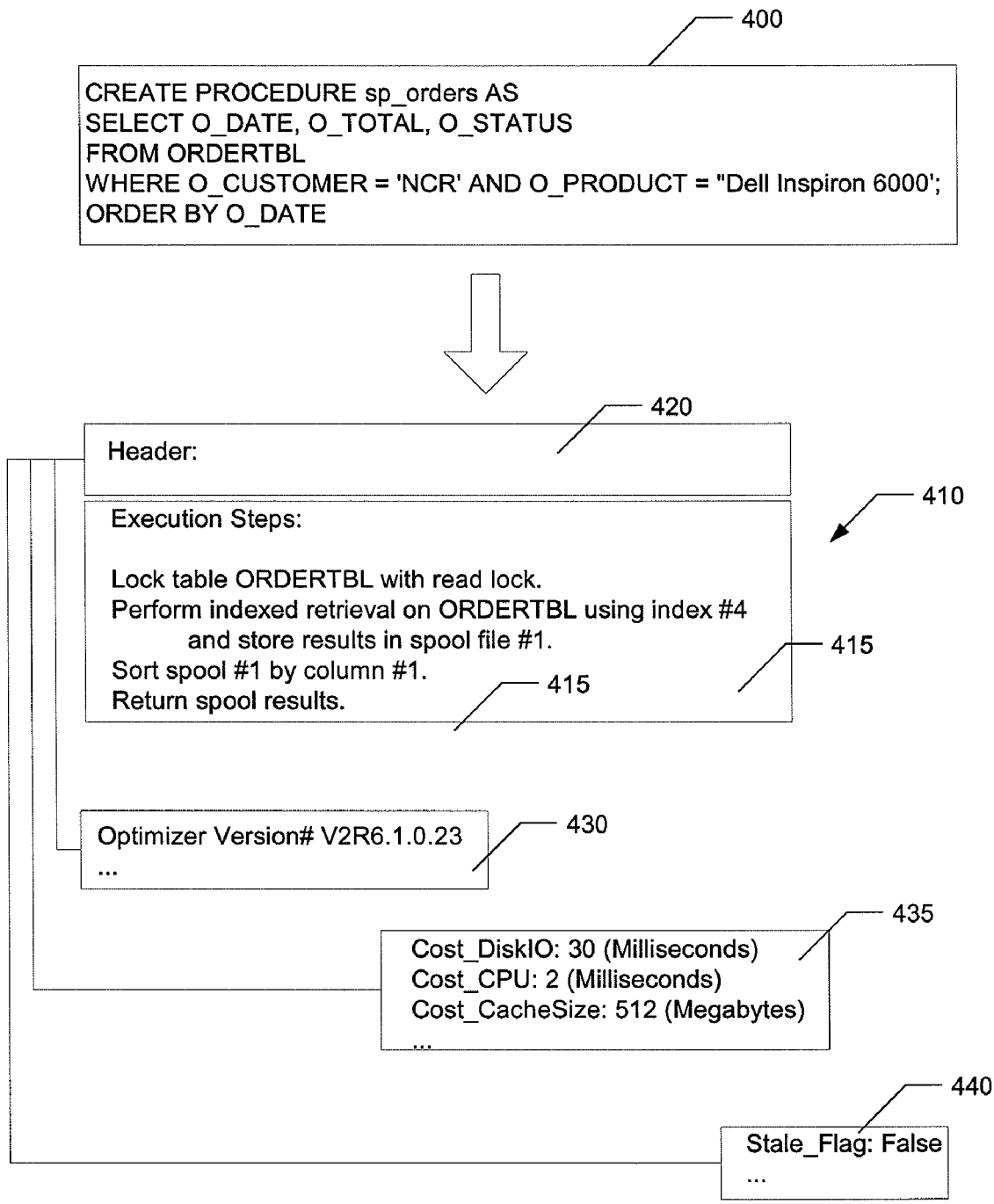
FIG. 4 is an example stored procedure and stored execution plan.

FIG. 4 illustrates a sample stored procedure 400 and a stored execution plan 410 generated from the stored procedure 400. The stored procedure 400 has a stored procedure name "sp_orders". The stored plan assumes that an index has been defined on column O_CUSTOMER from table ORDERTBL.

The execution plan 410 includes a sequence of execution steps indicated at 415. The execution plan also includes a header 420. Within the header is stored various information and data serving as input to rules described below for deciding when to recompile a particular stored procedure.

In some embodiments the header 420 includes the capacity to store system parameters which will be further described below. One example system parameter as indicated at 430 is the version number of the database software under which the stored plan was compiled. A further example of system parameters as shown at 435 is a set of configurable cost parameters. In other embodiments the header 420 includes an optimal indicator flag indicated at 440 which in some cases will indicate that a stored execution plan is sub-optimal or stale. This will also be described further below. It will be appreciated that the header 420 could include all or any combination of the information and data shown at 430, 435 and 440, as well as additional data.

The techniques described below present a solution that relies on a set of rules that identify events likely to alter a plan generated by an optimizer for a given query.

The first such rule is where a major release of the software containing the query optimizer is installed. If a new major release of a database software system is installed, it will almost certainly contain new features related to query optimization. To give the new optimizer an opportunity to use any new techniques, all stored plans that were compiled from older releases of the software should be recompiled.

The technique includes the storing of a system parameter for example a version number in the header of each stored plan as shown at 430. The version number is the version number of the database software under which the stored plan was compiled. During query execution, whenever a plan is fetched from storage, the version number from the header of the stored plan is compared with the current version running on the database system. On detecting a mismatch between the two version numbers, the stored plan is abandoned and a new stored execution plan is generated from the CREATE PROCEDURE statement.

This technique achieves the benefit that only stored plans that are actually used are recompiled.

A second rule uses system parameters such as cost parameters. This rule takes into account significant changes to the system's hardware configuration.

Sophisticated query optimizers take into account the hardware specifications of a system's CPUs, disks, network interconnect, and data cache size when estimating the costs of alternative plans. Such systems will typically store a set of configurable "cost parameters" as shown at 435. These cost parameters represent the basic hardware capabilities of the system at the time of plan compilation. They represent the cost of performing well defined low level operations for example the cost to read one block from a disk or could represent the configured size of a resource for example data cache size. The cost parameters are specific for a particular hardware configuration. These cost parameters are then used by the optimizer's formulae to estimate the total cost for various execution methods for example file scan, sort, nested loop join and so on. When the hardware of a system is changed, the optimizer's cost parameters are changed accordingly.

When a system's cost parameters are changed significantly, it is likely that the optimizer will choose an alternative plan to the plan currently stored as being the optimal plan. To identify such plans, each stored plan includes system parameters in the header. These system parameters include the cost parameters that were in effect when the stored plan was compiled. During query execution, whenever a plan is fetched from storage, the cost parameters in the header of the plan can be compared with the current cost parameters configured for the system.

If any pair of corresponding cost parameters differ significantly, the stored plan is abandoned and a new stored execution plan is generated from the create procedure statement. In one embodiment a constraint is that a significant difference must be a change of more than 10% in the cost parameters.

The upgrading of hardware has the potential to effect every stored plan. However this technique only recompiles stored plans that are actually used by the system.

The two remaining rules described below use an optimal indicator such as Stale_Flag shown at 440 in the header 420 of the stored execution plan. If the optimal indicator is set to a positive value then this indicates that the subject stored plan is "sub-optimal" and needs to be recompiled.

The third rule is triggered where statistics are collected on one or more of the tables referenced in a stored plan. The cost based query optimizer relies on collected distribution statistics to estimate the number of qualifying rows and the size of intermediate results. Such statistics are collected or refreshed whenever the user issues the appropriate "collect statistics" data definition language (DDL) statement on a particular table. Statistics have the potential to become stale over time and hence the user or application refreshes these statistics. From that point onwards it is very likely that the optimizer will choose a different plan for those queries that reference that table.

As part of the DDL statistics collection process, all stored plans referencing the table on which statistics are being collected can be identified and marked as sub-optimal or stale. A typical command to collect statistics is as follows:

```
COLLECT STATISTICS on ORDERTBL INDEX(O_CUSTOMER);
EXECUTE sp_orders;
```

In FIG. 4 if statistics are recollected on column O_CUSTOMER then Stale_Flag 440 in the header 420 is set to true. Based on the new statistics, the optimizer may or may not decide to continue using the index on O_CUSTOMER. Alternatively the optimizer may decide that a full table scan is less costly.

In the above example the Stale_Flag in the header of the stored plan 410 is set to true meaning that on execution of the plan the optimizer will refresh the stored plan using the new statistics.

When such plans are subsequently fetched from storage for execution, they are detected as being stale as Stale_Flag has been set to true. The stored plan is abandoned and a new stored execution plan is generated from the associated stored procedure.

It is assumed that the stored plans are in the form of an intermediate language in which the steps can be easily interpreted to determine the tables accessed by the plan. Furthermore, it is assumed that statistics collection is typically not performed nearly as frequently as the queries themselves. Statistics collection is required only when the underlying data distribution has significantly changed.

Most database systems have the capability of finding all plans for a given table to handle the case where a plan becomes invalid, for example dropping an index. For this reason, it is assumed that the cost of retrieving successive stored execution plans from the data dictionary and inserting a marker into the header indicating that the plan is sub-optimal is not a significant additional cost as the same searching method for invalid plans can be leveraged.

The fourth rule is triggered whenever new indices or materialized views are created on a table. The optimizer is provided with new access methods that may improve performance for those queries that reference that table where an index has been altered for that table. The creation of a new index is performed for example by the following:

```
CREATE INDEX (O_PRODUCT) ON ORDERTBL;
EXECUTE sp_orders;
```

In this technique, whenever one or more indices are generated for one or more tables within the database system, successive stored execution plans are retrieved from computer memory. Where a retrieved stored execution plan references at least one table for which one or more indices have been generated, the Stale_Flag the header associated with the stored execution plan is set to time indicating that the plan is sub-optimal. Based on the availability of the new index on O_PRODUCT, the optimizer may decide to use this new index instead of the one on O_CUSTOMER.

On execution of a stored plan, if a sub-optimal indicator is detected in the header of the retrieved stored execution plan then a new stored execution plan is generated from the associated stored procedure.

The third and fourth rules use a Stale_Flag. If the Stale_Flag of an execution plan is set to true, this indicates to the optimizer that the plan is potentially stale and requires recompilation. It will be appreciated that with minor modification an alternative technique is to set the value of an alternative flag to true if the execution plan is optimal. On detection of a false value the optimizer is alerted to the fact that the plan requires recompilation.

The techniques described above have the potential to address one of the major drawbacks of using stored execution plans, mainly the issue of plans becoming stale or non optimal over an extended period of time. The techniques described above use a set of well defined and easily identified events that trigger plan recompilations. In addition, the original benefits from reusing stored plans are retained by limiting the recompilations to those cases where it is highly probable that a new plan will be generated.

The text above describes one or more specific embodiments of a broader invention. The invention also is carried out in a variety of alternative embodiments and thus is not limited to those described here. Those other embodiments are also within the scope of the following claims.

We claim:

1. A method of selectively recompiling stored execution plans within a database system, the execution plans including respective version numbers of database software operable within the database system during compilation of the respective plans, the method comprising:
   receiving a request to execute one of the stored execution plans;
   retrieving the stored execution plan from computer memory;
   obtaining a version number of database software operable within the database system during retrieval of the stored execution plan;
   comparing the obtained version number with the version number associated with the retrieved execution plan; and
   on detecting a mismatch between the obtained version number and the retrieved version number, recompiling the stored execution plan.

2. A method of selectively recompiling stored execution plans within a database system, the stored execution plans including respective cost parameters representing the hardware capabilities of the system at the time of plan compilation, the method comprising:
   receiving a request to execute one of the stored execution plans;
   retrieving the stored execution plan from computer memory;
   defining a set of cost parameters representing the cost of executing the stored execution plan within the database system;
   comparing the defined cost parameters with the stored cost parameters associated with the retrieved execution plan; and
   on detecting a significant difference between the defined cost parameters and the retrieved cost parameters, recompiling the stored execution plan.

3. The method of claim 2 wherein the significant difference includes a difference of 10% or greater.

4. The method of claim 2 wherein the cost parameters include the cost to read one block from disk within the database system.

5. The method of claim 2 wherein the cost parameters include the configured size of a resource within the database system.

6. A method of selectively recompiling stored execution plans within a database system, the execution plans including respective sub-optimal indicators, the method comprising:
   receiving a request to execute one of the stored execution plans;
   retrieving the stored execution plan from computer memory;
   checking the status of the sub-optimal indicator associated with the retrieved execution plan; and
   on detecting a positive value for the sub-optimal indicator, recompiling the stored execution plan.

7. A method of selecting one or more stored execution plans within a database system for recompilation, the stored execution plans referencing respective one or more tables defined within the database system, the method comprising:
   collecting statistics on one or more of the tables within the database system;
   retrieving successive stored execution plans from computer memory; and
   where a retrieved stored execution plan references at least one table on which statistics have been collected, setting the value of a marker in the header associated with the stored execution plan to indicate that the plan is sub-optimal.

8. A method of selecting one or more stored execution plans within a database system for recompilation, the stored execution plans referencing respective one or more tables defined within the database system, the method comprising:
   generating one or more indices on one or more of the tables within the database system;
   retrieving successive stored execution plans from computer memory; and
   where a retrieved stored execution plan references at least one table for which one or more indices have been generated, setting the value of a marker in the header associated with the stored execution plan to indicate that the plan is sub-optimal.

9. A system for selectively recompiling stored execution plans within a database system, the execution plans including respective version numbers of database software operable within the database system during compilation of the respective plans, where the system is configured to:
   receive a request to execute one of the stored execution plans;
   retrieve the stored execution plan from computer memory;
   obtain a version number of database software operable within the database system during retrieval of the stored execution plan;
   compare the obtained version number with the version number associated with the retrieved execution plan; and
   on detecting a mismatch between the obtained version number and the retrieved version number, recompile the stored execution plan.

10. A system for selectively recompiling stored execution plans within a database system, the execution plans including respective cost parameters representing the cost of executing the stored execution plan within the database system, where the system is configured to:
    receive a request to execute one of the stored execution plans;
    retrieve the stored execution plan from computer memory;
    defining a set of cost parameters representing the cost of executing the stored execution plan within the database system;
    compare the defined cost parameters with the stored cost parameters associated with the retrieved execution plan; and
    on detecting a significant difference between the defined cost parameters and the retrieved cost parameters, recompile the stored execution plan.

11. The system of claim 10, where the significant difference includes a difference of 10% or greater.

12. The system of claim 10 wherein the cost parameters include the cost to read one block from disk within the database system.

13. The system of claim 10 wherein the cost parameters include the configured size of a resource within the database system.

14. A system for selectively recompiling stored execution plans within a database system, the execution plans including respective sub-optimal indicators, where the system is configured to:
receive a request to execute one of the stored execution plans;
retrieve the stored execution plan from computer memory;
check the status of the sub-optimal indicator associated with the retrieved execution plan; and
on detecting a positive value for the sub-optimal indicator, recompile the stored execution plan.

15. A system for selecting one or more stored execution plans within a database system for recompilation, the stored execution plans referencing respective one or more tables defined within the database system, where the system is configured to:
collect statistics on one or more of the tables within the database system;
retrieve successive stored execution plans from computer memory; and
where a retrieved stored execution plan references at least one table on which statistics have been collected, set the value of a marker in the header associated with the stored execution plan to indicate that the plan is sub-optimal.

16. A system for selecting one or more stored execution plans within a database system for recompilation, the stored execution plans referencing respective one or more tables defined within the database system, where the system is configured to:
generate one or more indices on one or more of the tables within the database system;
retrieve successive stored execution plans from computer memory; and
where a retrieved stored execution plan references at least one table for which one or more indices have been generated, set the value of a marker in the header associated with the stored execution plan to indicate that the plan is sub-optimal.

* * * * *